United States Patent
Schulz et al.

(10) Patent No.: US 12,521,931 B2
(45) Date of Patent: Jan. 13, 2026

(54) COOLING THE BLOWING MOLDING MACHINE WITHOUT EXTERNAL COOLER

(71) Applicant: KRONES AG, Neutraubling (DE)

(72) Inventors: Danilo Schulz, Rain (DE); Alexander Kaiser, Aholfing (DE); Michael Kobel, Mintraching (DE); Robert Aust, Illkofen (DE); Konrad Senn, Alteglofsheim (DE)

(73) Assignee: KRONES AG, Neutraubling (DE)

( * ) Notice: Subject to any disclaimer, the term of this patent is extended or adjusted under 35 U.S.C. 154(b) by 150 days.

(21) Appl. No.: 18/244,848

(22) Filed: Sep. 11, 2023

(65) Prior Publication Data

US 2024/0083094 A1    Mar. 14, 2024

(30) Foreign Application Priority Data

Sep. 9, 2022    (DE) .................... 10 2022 123 063.5

(51) Int. Cl.
*B29C 49/64* (2006.01)
*B29C 49/42* (2006.01)
*B29L 31/00* (2006.01)

(52) U.S. Cl.
CPC ........ *B29C 49/64* (2013.01); *B29C 49/42069* (2022.05); *B29C 49/4281* (2022.05); *B29L 2031/712* (2013.01)

(58) Field of Classification Search
CPC .......... B29C 49/4281; B29C 49/42408; B29C 49/42069; B29C 49/64; B29C 49/4286; B29C 2049/7864; B29C 2949/0715; B29C 49/12; B29C 2049/4825; B29C 2049/4697; B29C 49/36; B67C 3/02; B67C 2003/227; B29L 2031/712
See application file for complete search history.

(56) References Cited

U.S. PATENT DOCUMENTS

| | | | |
|---|---|---|---|
| 2016/0002018 A1 | 1/2016 | Clusserath | ............ B67C 7/0073 |
| 2017/0274576 A1 | 9/2017 | Hahn | ...................... B29C 49/48 |

FOREIGN PATENT DOCUMENTS

| | | | |
|---|---|---|---|
| DE | 29605261 | 5/1996 | ............... B67C 3/16 |
| DE | 102009049150 | 4/2011 | ............. B29C 49/64 |
| DE | 2956288 | 3/2017 | ............. B29C 49/64 |
| DE | 102015116037 | 3/2017 | ............. B29C 49/78 |
| DE | 102019119596 | 1/2021 | ............... B67C 3/22 |

(Continued)

OTHER PUBLICATIONS

Extended Search Report issued in EPO Patent Appln. Serial No. 23195105.4-1014, dated Feb. 2, 2024, with machine English translation, 17 pages.

(Continued)

*Primary Examiner* — Monica A Huson
(74) *Attorney, Agent, or Firm* — HAYES SOLOWAY P.C.

(57) ABSTRACT

An apparatus for producing plastic containers filled with a liquid, having a forming device which forms plastic preforms into containers, and a filling device which fills the containers with the liquid, wherein the filling device has a transport device which transports the containers during their filling and a plurality of filling devices which fill the containers. The apparatus has a supply line in order to supply the liquid to be filled to the filling devices, wherein the apparatus has at least one heat exchanger device which is configured to also use the liquid to be supplied to the filling devices for cooling components of the forming device and/or a further treatment unit.

13 Claims, 1 Drawing Sheet

(56) References Cited

FOREIGN PATENT DOCUMENTS

| EP | 2580153 | 2/2015 | ............... B67C 3/02 |
| EP | 3668697 | 5/2021 | ............. B29C 49/36 |

OTHER PUBLICATIONS

Search Report issued in German Patent Appln. Serial No. 10 2022 123 063.5, dated May 12, 2023, with machine English translation, 7 pages.

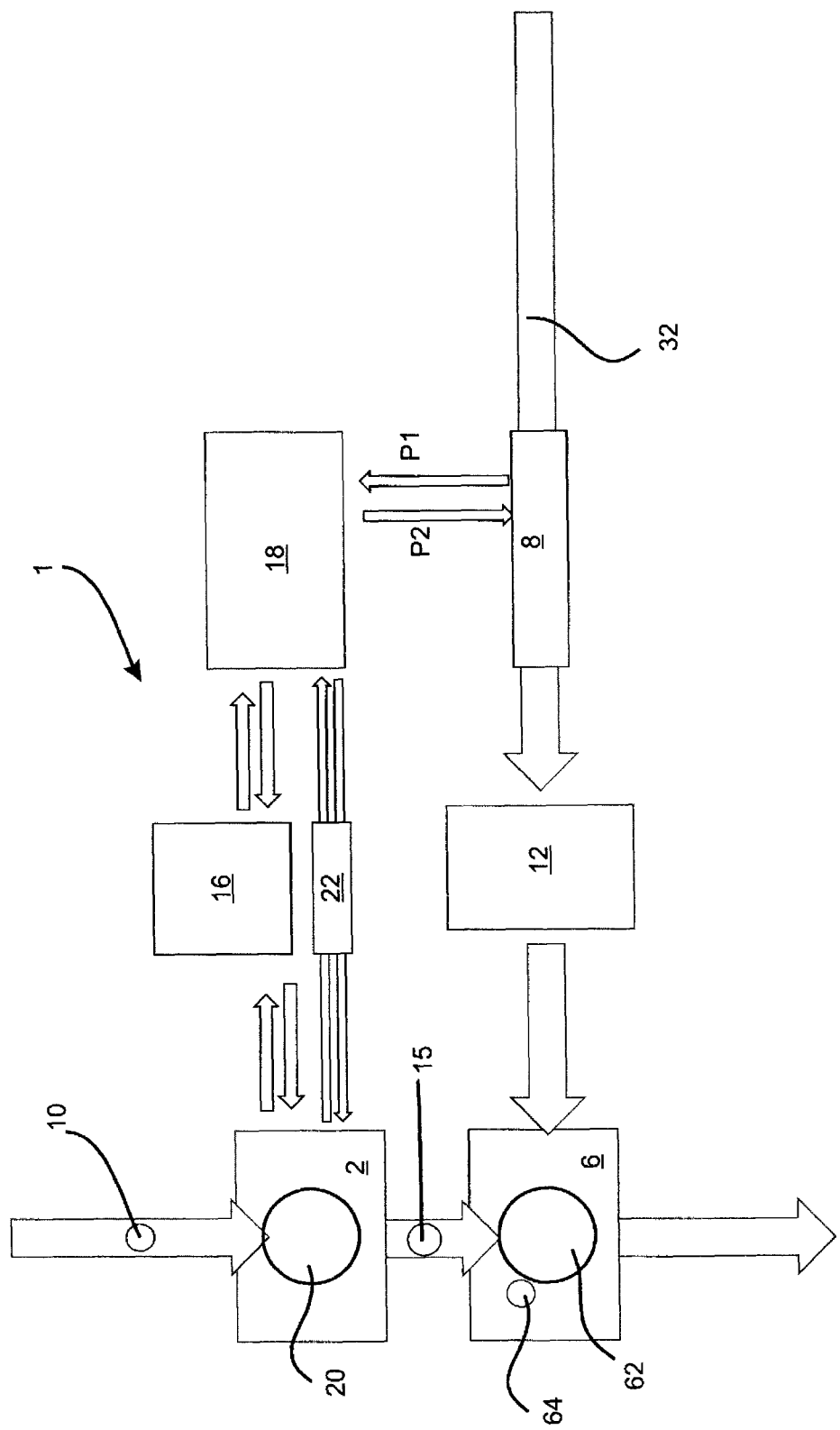

COOLING THE BLOWING MOLDING MACHINE WITHOUT EXTERNAL COOLER

BACKGROUND OF THE INVENTION

The present invention relates to a method and an apparatus for producing plastic containers filled with a liquid. Such machines have long been known from the prior art. The present invention relates in particular to a machine in which plastic containers are first manufactured from plastic preforms, and they are subsequently filled with a liquid and in particular with a beverage.

It is known in the prior art that such forming apparatuses and in particular components of the individual forming stations are cooled, and in particular e.g. blow molds or the like are cooled.

For this purpose, such forming machines such as blowing molding machines typically have a cooling unit delivered by the manufacturer. In addition, a connection to a refrigeration system installed by the customer can also be made. Therefore, either a cooler must be delivered with each machine, or such cooling must be provided with the piping or the like.

The present invention is therefore based on the object of simplifying such cooling of the forming device or components thereof.

SUMMARY OF THE INVENTION

An apparatus according to the invention for producing plastic containers filled with a liquid has a forming device which forms plastic preforms into plastic containers. Furthermore, a filling device is provided which fills the manufactured plastic containers with a liquid.

The filling device has a transport device which transports the containers during their filling. In addition, a plurality of filling devices is also provided which fill the containers. Furthermore, the apparatus has a supply line for supplying the liquid to be filled to the filling devices.

According to the invention, the apparatus has a heat exchanger device which is suitable and intended for using the liquid to be supplied to the filling devices also for cooling components of the forming device and/or a further treatment unit.

The further treatment device can be, for example, a labeling machine or also further components of the apparatus such as, in particular, switching cabinets.

This is understood in particular to mean that the comparatively low temperature of the liquid is also used to cool components of the forming device. Said heat exchanger accordingly serves in particular to "withdraw cold" from the liquid in order to thereby cool components of the forming device. In this case, a (slight) heating of the liquid to be supplied to the containers can occur, but this is generally unproblematic.

The invention is based on the idea that a medium is available in a region of the apparatus, namely on the path to the filling device, namely the liquid to be filled, which can also be used for cooling purposes.

Preferably, therefore, a way is created to realize cooling via the product flow, wherein preferably as described in more detail below, a way to start or stop the forming device with cooling energy is controlled. In so doing, it is preferably also possible to control or allow the forming device to be started or stopped with cooling energy.

In an advantageous embodiment, the heat exchanger device is suitable and intended to use the product flow of the liquid for cooling components of the forming device.

These components of the forming device are preferably selected from a group of components which contain a blow mold, in particular the side parts of a blow mold, a base part of a blow mold, a stretching rod and the like.

The heat exchanger device is preferably selected from a group of heat exchanger devices which includes liquid/gas heat exchangers and liquid/liquid heat exchangers.

Preferably, the product to be filled or the product flow cools the cooling medium directly.

The product and the cooling medium are preferably separated from one another, for example by a wall and/or a safety medium. In this way, contamination of the product can be prevented.

The heat exchanger device is preferably made at least sectionally from a food-grade material. In particular, the product-conducting components of the heat exchanger device are made of a food-grade material.

The heat exchanger device preferably has a monitoring device which monitors a positive pressure gradient.

In a preferred embodiment, the heat exchanger device is arranged in spatial proximity to the forming device. Preferably, product lines which serve to conduct the product flow are arranged in spatial proximity to the forming device. This embodiment makes it possible to avoid losses due to long transport paths.

In a further advantageous embodiment, the forming device has a transport device for transporting plastic preforms, and this transport device has a movable and in particular rotatable carrier on which a plurality of forming stations is arranged, wherein said forming stations each have blow molding devices within which the plastic preforms can be formed into the plastic containers.

Preferably, the components of each one of these mentioned forming stations are cooled.

Particularly preferably, the forming stations also each have application devices and in particular blowing nozzles which can be placed on a mouth of the plastic preforms or also on a support ring in order to apply the gaseous medium to the latter. In a particularly preferred embodiment, the forming stations also each have stretching units that are suitable and intended for stretching the plastic preforms in their longitudinal direction.

The forming stations preferably have components through which a coolant can flow. In particular, a cooling agent can flow through parts of the blow molds and/or holding devices of the blow molds. This cooling agent preferably originates at least partially from the aforementioned heat exchanger device.

In a preferred embodiment, at least one conveying device for conveying a coolant is provided between the aforementioned heat exchanger device and the forming device.

In a further advantageous embodiment, the forming device has a clean room within which the plastic preforms can be expanded into the plastic containers. Preferably, this clean room is sealed from a (non-sterile) environment by means of at least one wall. In a preferred embodiment, the forming device has a sealing device that seals the clean room from a (non-sterile) environment. This sealing device can in particular be a hydraulic seal and in particular a so-called water lock. For such a sterile blow molding machine, this type of cooling is particularly suitable since it is easier to ensure that the cooling takes place under clean room conditions.

In a preferred embodiment, the filling device has a stationary beverage supply, for example a beverage tank.

Particularly preferably, the apparatus has a rotary distributor for conveying the liquid and in particular the beverage to a beverage tank, wherein this beverage tank is preferably arranged on a movable and in particular rotatable element of the filling device.

Particularly preferably, this beverage line can be used directly for cooling the forming device. However, it would also be conceivable to create branches or branching lines which serve for cooling or operating the heat exchanger described above.

In a further advantageous embodiment, as mentioned above, cooling of blow molds is performed.

In a further advantageous embodiment, a transport device is provided which transports the containers manufactured by the forming device to the filling device.

In a further advantageous embodiment, the apparatus has a heating device and in particular an oven for heating the plastic preforms. In a preferred embodiment, the forming device and the filling device are synchronized with one another and/or are controlled together. Accordingly, for example, an acceleration of the forming device also results in a corresponding acceleration of the filling device.

In a further preferred embodiment, the apparatus has a storage device for storing a cooling medium, and/or a storage device for temporarily storing the liquid to be filled. For example, a reservoir can be provided in which a liquid coolant which is used for cooling the blow molds can be stored, wherein this liquid coolant preferably originates from the aforementioned heat exchanger.

It is also possible for a reservoir to be provided for intermediate storing the liquid to be filled, from which in turn the heat exchanger is fed.

In a preferred embodiment, the apparatus has a cooling device which is suitable and intended for cooling the cooling liquid in the storage device before or during start-up mode. This cooling device can be dimensioned comparatively small because it primarily serves for a start and/or start-up mode of the apparatus. This further cooling device is preferably an electrically operated cooling device and can have, for example, a Peltier element.

In a further advantageous embodiment, the apparatus has a (further) cooling device for cooling components of the forming device. It is therefore proposed here that a further cooling device is provided which cools components of the forming device. This can optionally be dimensioned smaller since, as mentioned above, a portion of the cooling is achieved by the product to be filled.

In a further advantageous embodiment, the apparatus has a control device which a enables start-up mode and/or working mode of the apparatus, wherein the components of the forming device are cooled less by the product flow during start-up mode.

This is based on the fact that, at the beginning of production, there may still not be enough available cooling power because a sufficient product flow is not available. However, it would also be possible for the cooling to be started even when the beverage is being transported, for example, into an intermediate storage, and the heat exchanger also starts in this region. It should also be taken into account that full cooling may not yet be required while starting up the system since the blow molds, for example, have not yet heated up.

In a further preferred embodiment, the apparatus has a control device which controls a speed of the apparatus, and in particular a transport speed of the containers depending on available cooling power.

In a further advantageous embodiment, as mentioned above, the forming device and the filling device are blocked and/or synchronized with one another.

In this case, it is possible for this blocking to be canceled in a specific operating mode, for example during startup mode. Subsequently, the machines can, for example, be synchronized.

The present invention is further directed to a method with plastic containers filled with a liquid, wherein a forming device forms plastic preforms into plastic containers, and a transport device transports the plastic containers (in particular from the forming device) to a filling device, and the filling device fills the plastic containers with the liquid, wherein the filling device has a transport device which transports the containers during their filling, and a plurality of filling devices is provided which fill the containers. Furthermore, a supply line of the filling device supplies the liquid to be filled.

According to the invention, a product flow for the filling device is used to cool components of the forming device and/or a further treatment unit.

It is therefore also proposed for the method that a portion of the cooling is carried out by the filling device or by components of the filling device, and in particular a product supply.

In a further preferred method, a heat exchanger device is provided, and/or a heat exchanger device is used to cool the components of the forming device by means of the product flow.

In a further preferred method, a further cooling device also cools components of the forming device. It is possible for this additional cooling device to cool the components temporarily until the heat exchanger cooling device described above acts, or this further cooling device also provides additional cooling.

In a further preferred method, cooling energy is stored at least temporarily.

BRIEF DESCRIPTION OF THE DRAWINGS

Further advantages and embodiments emerge from the accompanying drawing. In the drawings:

FIG. 1 shows a block diagrammatic representation of the present invention.

DETAILED DESCRIPTION OF THE DRAWINGS

FIG. 1 shows a schematic representation of an apparatus 1 according to the invention for producing containers filled with liquid. In so doing, plastic preforms 10 are supplied to a forming device 2 and are formed there into plastic containers 15. The forming device has a transport device 20 such as a blowing wheel for transporting the plastic preforms to be expanded.

The plastic containers 15 are transported to a filling device 6 and filled there. For this purpose, the filling device 6 preferably also has a rotatable transport device 62 on which a plurality of filling devices 64 is arranged. The filled containers are preferably closed and transported away.

The reference sign 32 designates a supply line which supplies the liquid to be filled and in particular a beverage to be filled to the filling device.

The reference sign 8 designates a heat exchanger device which serves to use the product flow which flows through the supply line for cooling other parts of the apparatus, here the forming device 2. However, it is noted that also other components of a system for producing containers can also be cooled in this way.

The arrow P1 indicates "cooling energy" which is ultimately intended for cooling the device 2, and the arrow P2 indicates heat which flows to the heat exchanger device 8 or its lower part.

The reference sign 12 designates an optional buffer tank in which the liquid to be filled can be stored. This buffer tank is preferably arranged in the flow direction of the product downstream from the heat exchanger 8.

The reference sign 16 designates an optional buffer tank which can be cooled by the heat exchanger 8, wherein here as well, the two arrows indicate the flow of the cooling energy (lower arrow) and the flow of the thermal energy.

This optional buffer tank can also itself act as a heat exchanger. In this embodiment, the forming device is accordingly cooled via the intermediate buffer tank.

The reference sign 22 designates a bypass for circumventing the buffer tank 16. If this bypass is activated, the forming device is cooled directly by the heat exchanger.

The applicant reserves the right to claim all features disclosed in the application documents as essential to the invention, provided that they are novel over the prior art individually or in combination. It is also pointed out that features which can be advantageous in themselves are also described in the individual FIGURES. The person skilled in the art will immediately recognize that a particular feature described in a FIGURE can be advantageous even without the adoption of further features from this FIGURE. Furthermore, the person skilled in the art will recognize that advantages can also result from a combination of several features shown in individual or in different FIGURES.

The invention claimed is:

1. An apparatus for producing plastic containers filled with a liquid, having a forming device configured to form plastic preforms into plastic containers, and having a filling device configured to fill the plastic containers with the liquid, wherein the filling device has a transport device configured to transport the containers during their filling and has a plurality of filling devices configured to fill the containers, wherein the apparatus has a supply line configured to supply the liquid to be filled to the filling devices,
wherein
the apparatus has at least one heat exchanger device which is configured to use the liquid to be supplied to the filling devices for cooling components of the forming device and/or a further treatment unit before the liquid is supplied to the filling device.

2. The apparatus according to claim 1,
wherein
the heat exchanger device is configured to use product flow of the liquid for cooling components of the forming device.

3. The apparatus according to claim 1,
wherein
the forming device has a transport device configured for transporting the plastic preforms, and the transport device has a rotatable carrier on which a plurality of forming stations is arranged, wherein the forming stations each have blow molding devices within which the plastic preforms are formed into the plastic containers.

4. The apparatus according to claim 1,
wherein
the apparatus has a storage device configured for storing a cooling medium.

5. The apparatus according to claim 1,
wherein
the apparatus has a cooling device configured for cooling the cooling liquid in the storage device before or during a start-up mode.

6. The apparatus according to claim 1,
wherein
the apparatus has a cooling device configured for cooling components of the forming device.

7. The apparatus according to claim 1,
wherein
the apparatus has a control device configured to enable a start-up mode and a working mode of the apparatus, wherein the components of the forming device are cooled less by the product flow during start-up mode.

8. The apparatus according to claim 1,
wherein
the apparatus has a control device configured to control a speed of the apparatus, the containers, depending on an available cooling power.

9. The apparatus according to claim 1,
wherein
the forming device and the filling device are blocked and/or synchronized with one another.

10. A method for producing plastic containers filled with a liquid, wherein a forming device forms plastic preforms into plastic containers, a transport device transports the plastic containers to a filling device, and the filling device fills the plastic containers with the liquid, wherein the filling device has a transport device which transports the containers during their filling and has a plurality of filling devices which fill the containers, and wherein a supply line of the filling device supplies the liquid to be filled,
wherein
a product flow of the liquid to be supplied to the filling device is used to cool components of the forming device and/or a further treatment unit before the liquid is supplied to the filling device.

11. The method according to claim 10,
wherein
a heat exchanger device is provided to cool the components of the forming device using the product flow.

12. The method according to claim 10,
wherein
a further cooling device cools components of the forming device.

13. The method according to claim 10,
wherein
cooling energy is stored.

* * * * *